US011603791B2

(12) United States Patent
Ouwenga et al.

(10) Patent No.: US 11,603,791 B2
(45) Date of Patent: Mar. 14, 2023

(54) SUPERCHARGER

(71) Applicant: Eaton Intelligent Power Limited, Dublin (IE)

(72) Inventors: Daniel R. Ouwenga, Portage, MI (US); Matthew M. Henry, Kalamazoo, MI (US); Justin Keiffer, Nashville, MI (US); Kenneth A. Rienas, Howell, MI (US)

(73) Assignee: Eaton Intelligent Power Limited, Dublin (IE)

( * ) Notice: Subject to any disclaimer, the term of this patent is extended or adjusted under 35 U.S.C. 154(b) by 507 days.

(21) Appl. No.: 16/590,963

(22) Filed: Oct. 2, 2019

(65) Prior Publication Data

US 2020/0102881 A1   Apr. 2, 2020

Related U.S. Application Data

(63) Continuation of application No. 14/717,050, filed on May 20, 2015, now Pat. No. 10,436,104.
(Continued)

(51) Int. Cl.
*F02B 33/40* (2006.01)
*F02B 33/38* (2006.01)
(Continued)

(52) U.S. Cl.
CPC .............. *F02B 33/40* (2013.01); *F01C 17/02* (2013.01); *F01C 21/02* (2013.01); *F02B 33/38* (2013.01);
(Continued)

(58) Field of Classification Search
CPC .......... F01C 17/02; F01C 21/02; F01C 21/04; F01C 21/045; F02B 33/38; F02B 33/40; F02B 39/14; F04C 2/107; F04C 11/005; F04C 15/0003; F04C 15/0007; F04C 15/0023; F04C 15/0088; F04C 15/0092; F04C 29/02–025; F04C 29/0042; F04C 2240/30; F04C 2240/603; F04C 2240/809; F04C 18/107; F04C 18/16; F04C 23/005;
(Continued)

(56) References Cited

U.S. PATENT DOCUMENTS 2,829,736 A   4/1958  Troemel
4,173,440 A * 11/1979  Libis .................... F04C 29/021
                                                        418/98
(Continued)

*Primary Examiner* — Dominick L Plakkoottam
*Assistant Examiner* — Charles W Nichols
(74) *Attorney, Agent, or Firm* — Merchant & Gould P.C.

(57) ABSTRACT

A supercharger includes a rotor housing defining a pair of cylindrical chambers. A driving shaft bearing is to support a driving rotor shaft for rotation in the rotor housing. A driven shaft bearing is to support a driven rotor shaft for rotation in the rotor housing. An oil sump housing is to enclose a timing gear end of the rotor housing. A shaft seal is disposed between the rotor housing and each respective rotor shaft. The oil sump housing, the rotor housing and driving and driven shaft seals define a closed container for oil to lubricate the driving shaft bearing, the driven shaft bearing, a driving timing gear and a driven timing gear. The oil pools in the closed container and a top surface of the oil is spaced below the timing gears when the driving rotor shaft is in a vertical orientation.

12 Claims, 11 Drawing Sheets

Related U.S. Application Data

(60) Provisional application No. 62/002,410, filed on May 23, 2014, provisional application No. 62/002,437, filed on May 23, 2014.

(51) Int. Cl.
*F02B 39/14* (2006.01)
*F01C 17/02* (2006.01)
*F01C 21/02* (2006.01)
*F04C 27/00* (2006.01)
*F04C 29/02* (2006.01)
*F04C 18/16* (2006.01)
*F04C 29/00* (2006.01)

(52) U.S. Cl.
CPC .............. *F02B 39/14* (2013.01); *F04C 18/16* (2013.01); *F04C 27/009* (2013.01); *F04C 29/028* (2013.01); *F04C 29/0042* (2013.01); *Y02T 10/12* (2013.01)

(58) Field of Classification Search
CPC ...... F04C 27/009; F04C 29/028; F04C 27/00; Y02T 10/12
See application file for complete search history.

(56) References Cited

U.S. PATENT DOCUMENTS

| | | | |
|---|---|---|---|
| 4,394,113 A * | 7/1983 | Bammert | F04C 27/009 418/98 |
| 4,712,442 A | 12/1987 | Baika et al. | |
| 5,078,583 A | 1/1992 | Hampton et al. | |
| 5,893,355 A | 4/1999 | Glover et al. | |
| 6,086,343 A | 7/2000 | Sun et al. | |
| 6,318,959 B1 * | 11/2001 | Kambe | F04C 29/025 415/230 |
| 6,394,777 B2 | 5/2002 | Haavik | |
| 8,192,186 B2 | 6/2012 | Moens | |
| 8,439,569 B2 | 5/2013 | Ito et al. | |
| 2007/0022998 A1 | 2/2007 | Nagel et al. | |
| 2007/0025864 A1 | 2/2007 | Cho | |
| 2007/0098585 A1 * | 5/2007 | Yamamoto | F04C 29/023 418/201.1 |
| 2010/0253005 A1 * | 10/2010 | Liarakos | F16J 15/406 277/353 |
| 2012/0148435 A1 * | 6/2012 | Takaki | F04C 29/028 418/201.1 |

\* cited by examiner

SUPERCHARGER

CROSS-REFERENCE TO RELATED APPLICATIONS

This application is a continuation of U.S. application Ser. No. 14/717,050, filed May 20, 2015, now U.S. Pat. No. 10,436,104; which itself claims the benefit of U.S. Provisional Application Ser. No. 62/002,410, filed May 23, 2014, and 62/002,437, also filed May 23, 2014, the entire contents of each of which is incorporated by reference herein.

BACKGROUND

Superchargers can be used to increase or "boost" the air pressure in the intake manifold of an internal combustion (IC) engine to increase the power output of the IC engine. The power output of the IC engine can thus be increased over the output power of the IC engine if the IC engine were normally aspirated (e.g., the piston would draw air at ambient atmospheric pressure into the cylinder during the intake stroke of the piston). Some IC engines are "horizontal" engines, with a crankshaft that normally turns about a horizontal axis. When a supercharger is used to boost a horizontal engine, rotating portions of the supercharger can rotate about an axis that is substantially parallel to the crankshaft. For example, the rotors of a Roots blower type of supercharger can rotate about a horizontal axis. Another type of IC engine is a "vertical" engine, with a crankshaft that normally turns about a vertical axis. Vertical engines have been used, for example, in power lawn mowers, and marine applications. It is to be understood that horizontal and vertical engines are not limited to operation with the crankshaft in a respective horizontal or vertical orientation. For example, a lawn mower with a vertical engine can be operated on a hill, and piston powered horizontal engines can be used in vehicles on steep grades or aircraft in aerobatic maneuvers.

SUMMARY

A supercharger includes a rotor housing defining a pair of cylindrical chambers. A driving shaft bearing is to support a driving rotor shaft for rotation in the rotor housing. A driven shaft bearing is to support a driven rotor shaft for rotation in the rotor housing. An oil sump housing is to enclose a timing gear end of the rotor housing. A shaft seal is disposed between the rotor housing and each respective rotor shaft. The oil sump housing, the rotor housing and driving and driven shaft seals define a closed container for oil to lubricate the driving shaft bearing, the driven shaft bearing, a driving timing gear and a driven timing gear. The oil pools in the closed container and a top surface of the oil is spaced below the timing gears when the driving rotor shaft is in a vertical orientation.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

The present disclosure relates generally to a supercharger assembly and more specifically to a lubrication system for a supercharger assembly.

In some existing superchargers, the timing gears are partially submerged in an oil pool. Input power to such an existing supercharger is increased to overcome resistance to rotation of the shafts/rotors/gears caused by churning the oil with the timing gears. Input power as defined herein is power to overcome inertia and other losses in the supercharger. It may be advantageous to minimize a supercharger's input power. In examples of the present disclosure, the input power is reduced by keeping the timing gears out of the oil pool and using a pump or an oil slinger to flood the gears, bearings and seals. In other examples, oil from the pressurized engine oil circuit can be routed through the supercharger to lubricate the gears, bearings and seals. Since oil routed from the engine oil circuit can be filtered through the engine oil filter, the cleaner oil may promote longer service life of the supercharger. In examples of the present disclosure, oil and pressurized gas routed from an oil containing compartment of the supercharger (e.g., a supercharger gear case) to the engine's crank case can help to reduce pressure in the oil containing compartment of the supercharger.

Figure 1:
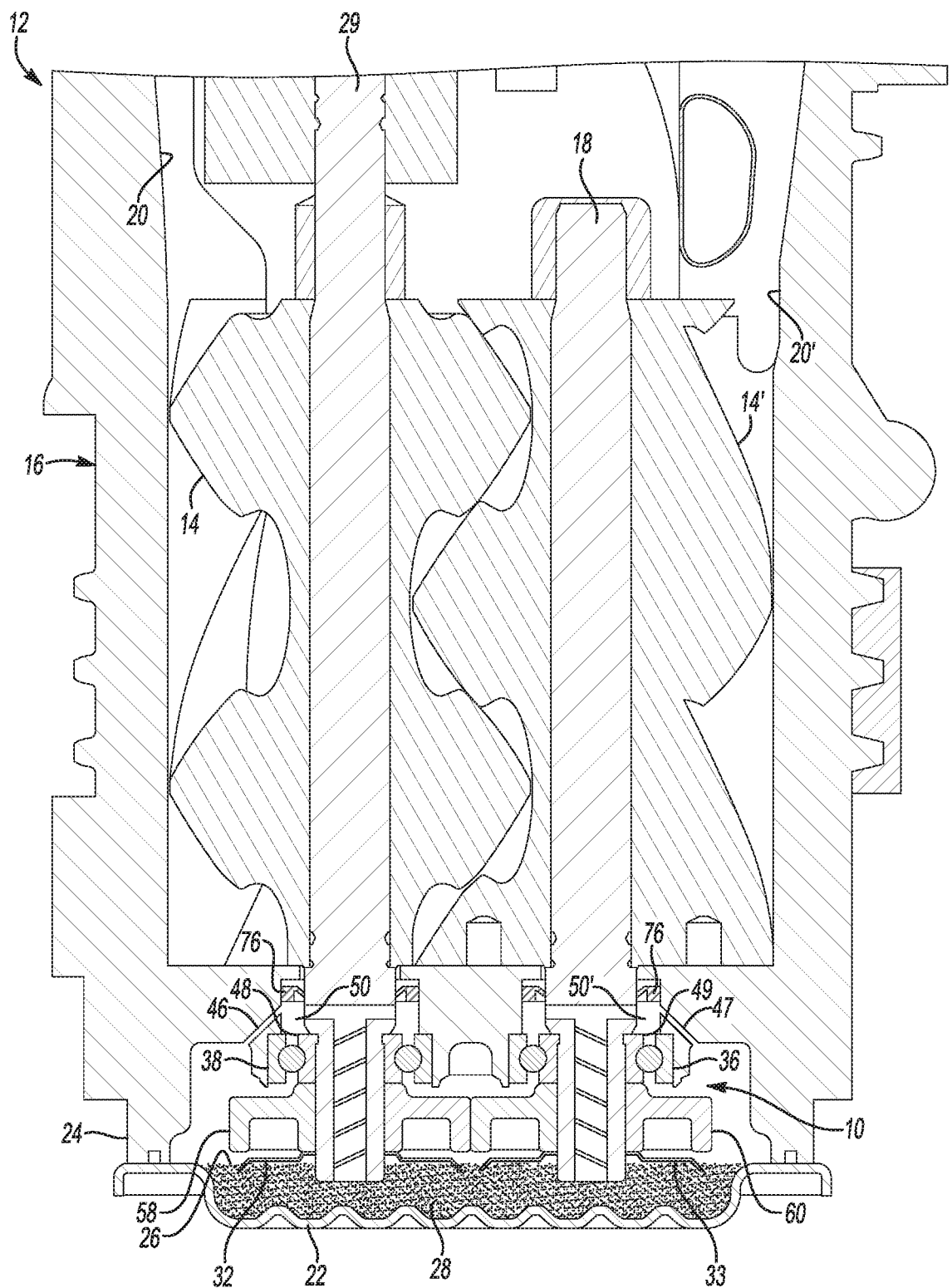
FIG. 1 is a cross-sectional view of a supercharger according to an example of the present disclosure.

A lubrication system 10 according to an example of the present disclosure is shown in FIG. 1. The lubrication system 10 can be configured for use with a supercharger 12 in accordance with an example of the present disclosure. The supercharger 12 may be connected to an intake manifold for an engine (not shown). The engine may include a plurality of cylinders and a reciprocating piston disposed within each cylinder, thereby defining an expandable combustion chamber. The engine may include intake and exhaust manifold assemblies for directing combustion fluid to and from the combustion chamber by way of intake and exhaust valves, respectively.

The supercharger 12 may be any positive displacement pump, including the Roots type blower supercharger as illustrated and described in U.S. Pat. Nos. 5,078,583 and 5,893,355 (which are owned by the assignee of the present disclosure and which are hereby incorporated by reference in their entirety), but is not necessarily limited thereto. The supercharger 12 may also comprise a screw compressor or any other type of positive displacement pump. In accordance with an example of the present disclosure, the supercharger 12 may include a plurality (e.g., pair) of rotors 14, 14', each having a plurality of meshed lobes. The rotors may be disposed in a plurality of parallel, transversely overlapping cylindrical chambers and may be driven by engine crankshaft torque transmitted thereto (e.g., via a drive belt). The supercharger 12 may include a main housing 16 that may define the plurality of cylindrical chambers. The main housing 16 may also be referred to as the rotor housing 16. The mechanical drive of the supercharger 12, including shaft 18, may rotate the rotors 14 at a fixed ratio, relative to the crankshaft speed, such that the displacement of the supercharger 12 is greater than the engine displacement, thereby boosting or supercharging the air flowing into the combustion chamber of the engine. The supercharger 12 may include an inlet port configured to receive fluid from an inlet duct or passage and an outlet port configured to direct charged air to the intake valves via a discharge duct. The inlet duct or passage and the discharge duct may be interconnected by means of a bypass passage. A bypass valve may be disposed within the bypass passage and may be configured to be moved between an open position and a closed position by means of an actuator assembly.

Referring to FIG. 1, a supercharger 12 according to the present disclosure includes a rotor housing 16 defining a pair of intersecting cylindrical chambers 20, 20'. A first rotor 14 is in intermeshing engagement with a second rotor 14' in the cylindrical chambers 20, 20'. A driving rotor shaft 29 is rotatable with the first rotor 14. A driving timing gear 58 can be disposed on the driving rotor shaft 29 for rotation therewith. A driven timing gear 60 can be meshingly engaged with the driving timing gear 58. A driven rotor shaft 18 can be rotatable with the second rotor 14' and coupled to the driven timing gear 60 for rotation therewith.

The driving timing gear 58 can be meshingly engaged with the driven timing gear 60. The driving timing gear 58 can be connected to the first rotor 14. The driven timing gear 60 can be connected to the second rotor 14'. The timing gears 58, 60 may include an equal number of gear teeth spaced at a relatively high tooth pitch. For example, timing gears 58, 60 may each have 30 teeth for meshing engagement with one another; therefore timing gears 58, 60 rotate with a substantially equal angular velocity therebetween. As such, the timing gears 58, 60 substantially synchronize the rotors 14, 14', thereby contributing to a low wear rate of the rotors 14, 14' and high efficiency of the supercharger 12.

A driving shaft bearing 38 can be to support the driving rotor shaft 29 for rotation in rotor housing 16. A driven shaft bearing 36 can be to support the driven rotor shaft 18 for rotation in the rotor housing 16. An oil sump housing 22 can be disposed to enclose a timing gear end 24 of the rotor housing 16. Shaft seals 76 are disposed between the rotor housing 16 and the driving and driven rotor shafts 29, 18. Although the shaft seals 76 depicted in FIG. 1 are lip seals, it is to be understood that other types of shaft seals 76 can be used in examples of the present disclosure. For example, O-ring seals and split-ring seals may be used instead of, or in addition to the lip seals shown in FIG. 1 and in other figures of the present disclosure.

The oil sump housing 22, the rotor housing 16 and the shaft seals 76 define a closed container 87 for oil to lubricate the driving shaft bearing 38, the driven shaft bearing 36, and the timing gears 58, 60. The oil pools in the closed container 87, and a top surface 26 of the oil 28 can be spaced below the timing gears 58, 60 when the driving rotor shaft 29 is in a vertical orientation. Since the driving rotor shaft 29 is parallel to the driven rotor shaft 18, when the driving rotor shaft 29 is vertical, the driven rotor shaft 18 is vertical. As used herein, a vertical orientation can be defined to mean that the rotor shafts 29, 18 are vertical, and that the sump housing 22 is below the timing gears 58, 60. It is to be understood that the supercharger 12 may be operable at other orientations. In an example, the supercharger 12 may be operable with the rotor shafts 29, 18 at any angle up to +/−45 degrees from vertical. In another example, the supercharger 12 may be operated at any angle, for example, in a personal watercraft that may perform acrobatic maneuvers.

The supercharger 12 according to the present disclosure may have a first oil slinger 32 connected to the driving rotor shaft 29 or the driving timing gear 58 for rotation therewith. A first port 46 may be defined by the rotor housing 16 to convey the oil 28 to an upper end 48 of the driving shaft bearing 38. Gravity urges the oil 28 to flow through the driving shaft bearing 38 for lubrication thereof. The first oil slinger 32 urges the oil 28 to flow through the first port 46 to a first chamber 80 above the driving shaft bearing 38 when the driving rotor shaft 29 is in the vertical orientation.

A second oil slinger 33 may be connected to the driven rotor shaft 18 or the driven timing gear 60 for rotation therewith. A second port 47 may be defined by the rotor housing 16 to convey the oil 28 to an upper end 49 of the driven shaft bearing 36. Gravity urges the oil 28 to flow through the driven shaft bearing 36 for lubrication thereof. The second oil slinger 33 urges the oil 28 to flow through the second port 47 to a second chamber 81 above the driven shaft bearing 36 when the driven rotor shaft 18 is in the vertical orientation.

Figure 2A:
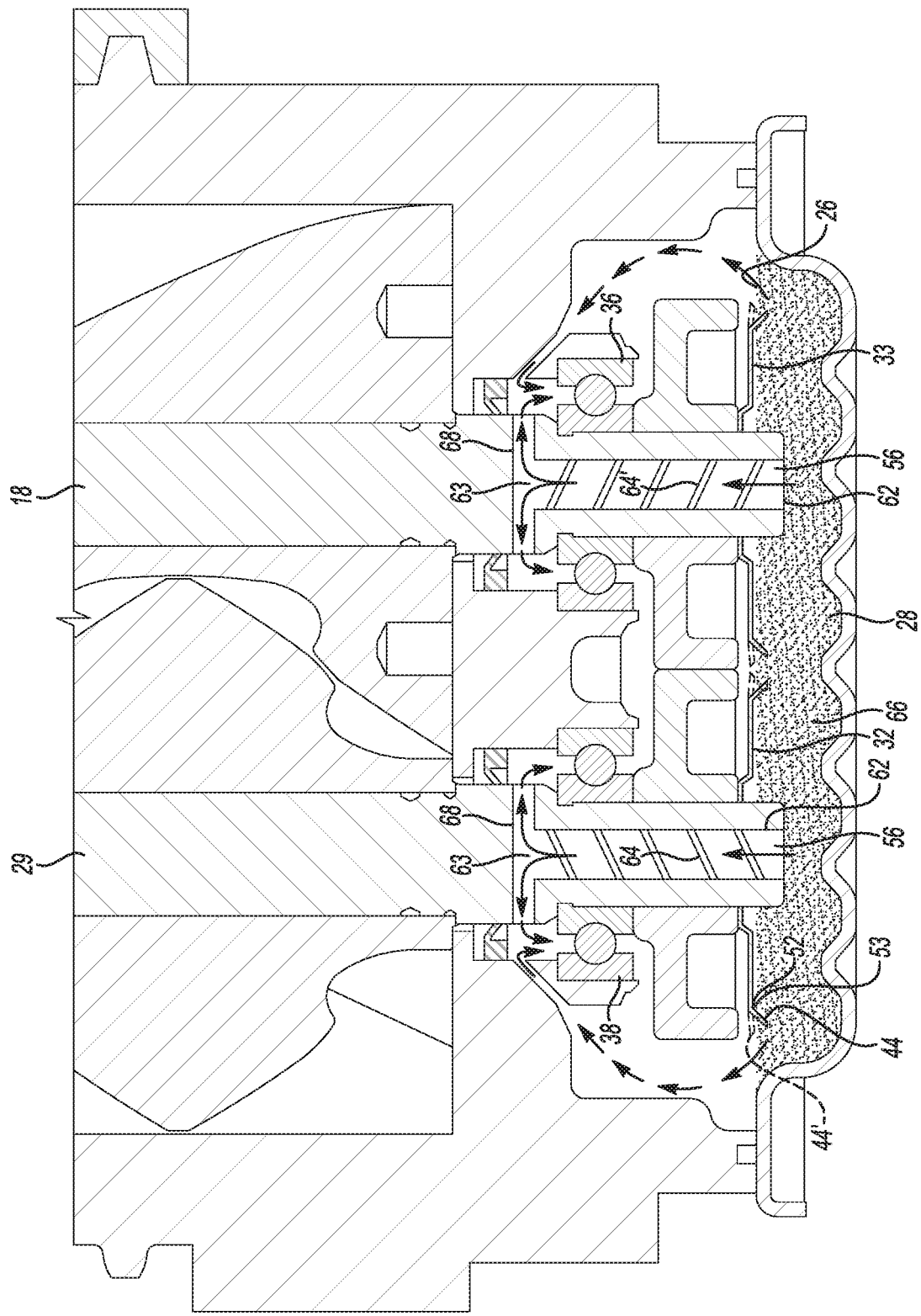
FIG. 2A is a cross-sectional view of a portion of the supercharger depicted in FIG. 1.

Referring now to FIG. 2A, an example of the supercharger 12 according to the present disclosure may have an oil slinger 32, 33 with variable geometry responsive to a rotational speed of the oil slinger 32, 33 to decrease churning of the oil 28 in response to an increase in the rotational speed of the oil slinger 32, 33. As depicted in FIG. 2A, an impeller blade 44 may be defined on the oil slinger 32, 33. The impeller blade 44 can have a spring hinge 52 at a root 53 of the impeller blade 44. Inertia of the impeller blade 44 causes the impeller blade 44 to rise above the top surface 26 of the oil 28 when the driving rotor shaft 29 and the driven rotor shaft 18 rotate at a shaft rotational speed greater than a threshold speed. The impeller blades 44 at a high rotational speed are depicted in hidden line at reference numeral 44'. In an example, the threshold speed may be about 20,000 revolutions per minute (RPM).

Still referring to FIG. 2A, the supercharger 12 in an example of the present disclosure may have a central bore 56 defined coaxial to each respective rotor shaft 29, 18. The central bore 56 may have an intake end 62 submerged below the top surface 26 of the oil 28 when the driving rotor shaft 29 is in the vertical orientation. Since the driving rotor shaft 29 is parallel to the driven rotor shaft 18, when the driving rotor shaft 29 is vertical, the driven rotor shaft 18 is vertical. The central bore 56 may have an output end 63 distal to the intake end 62. Spiral ridges or grooves 64, 64' may be disposed in the central bore 56 to elevate the oil 28 from the oil pool 66 by centrifugal action of the driving rotor shaft 29 or the driven rotor shaft 18. A cylindrical cross bore 68 may be defined in each of the rotor shafts 29, 18 in fluid communication with the central bore 56 to eject oil 28 onto the shaft bearings 38, 36. Since the first rotor 14 rotates in an opposite direction to the second rotor 14', the direction of the spiral ridges or grooves 64, 64' are correspondingly opposite. The spiral ridges or grooves 64 in the driving rotor shaft 29 are depicted as a right handed helix in FIG. 2A. The spiral ridges or grooves 64' in the driven rotor shaft 18 are depicted as a left handed helix in FIG. 2A. If the first and second rotors 14, 14' turned in the opposite direction, the corresponding spiral ridges or grooves 64, 64' would also have opposite helix directions.

Although both the central bores 56 and the oil slingers 32, 33 are shown on the same FIGS. 1 and 2A, they are not necessarily included in the same supercharger 12 according to the present disclosure. However, both the central bores 56 and the slingers 32, 33 may be combined in the same supercharger 12.

Figure 2B:
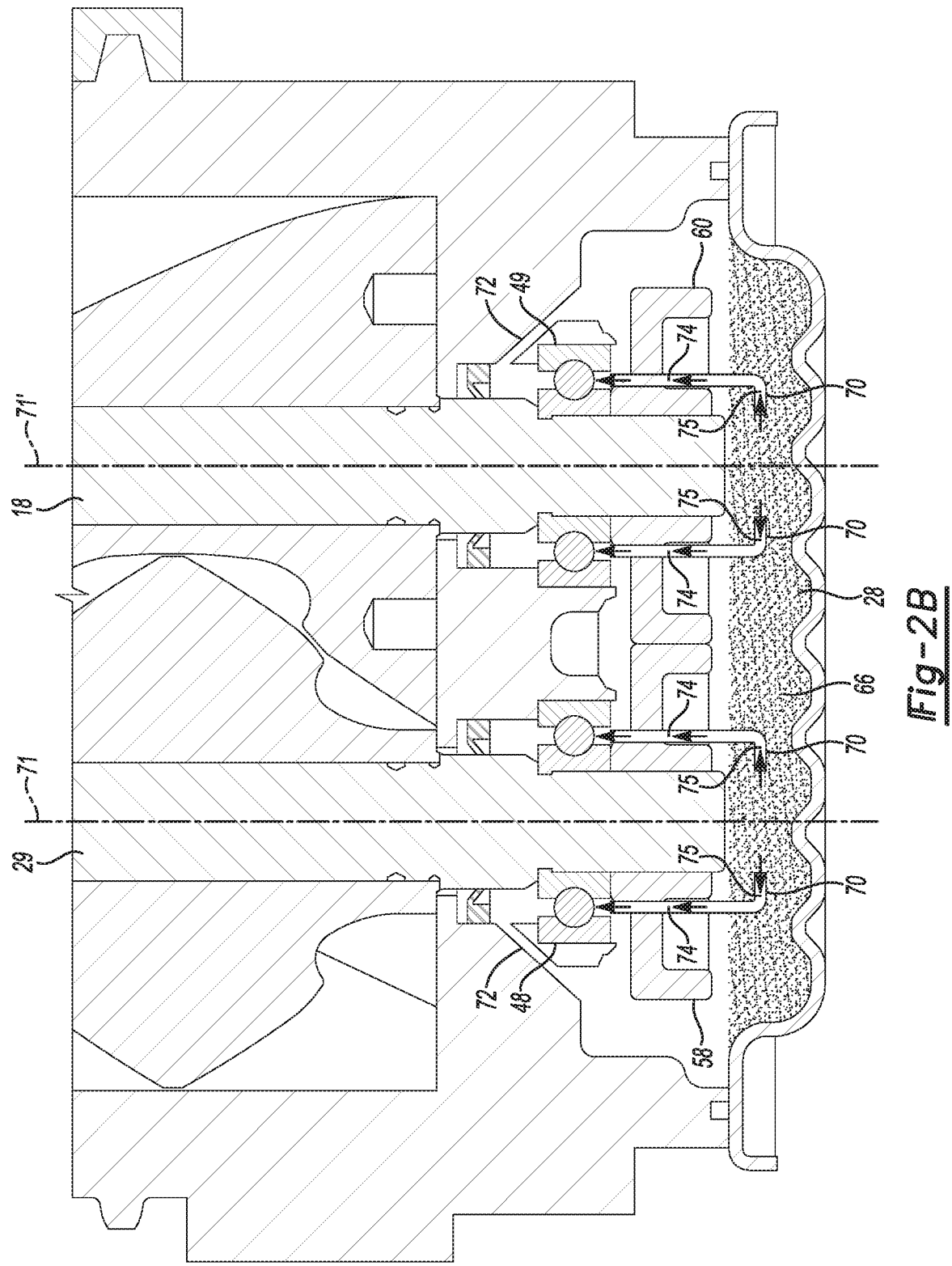
FIG. 2B is a cross-sectional view of the portion of the supercharger depicted in FIG. 1 with another oil distribution system.
Figure 3:
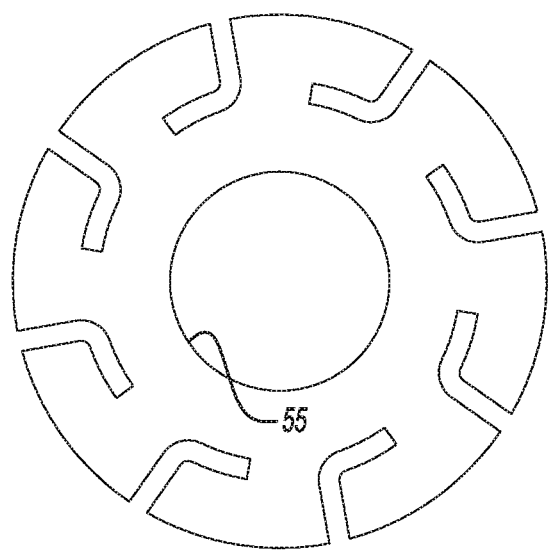
FIG. 3 is a top view of an example of an oil slinger according to the present disclosure.

Referring now to FIG. 2B, examples of the supercharger 12 of the present disclosure may include a pair of opposed centrifugal pump tubes 70 having a longitudinal portion 74 disposed parallel to the longitudinal axis 71, 71' of the rotor shaft 29, 18 and a radial portion 75 to draw oil 28 from the oil pool 66 by centrifugal action of the driving or driven timing gear 58, 60 and the centrifugal pump tubes 70 disposed therein. The pair of opposed centrifugal pump tubes 70 convey oil 28 to the respective shaft bearing 36, 38.

Figure 4:
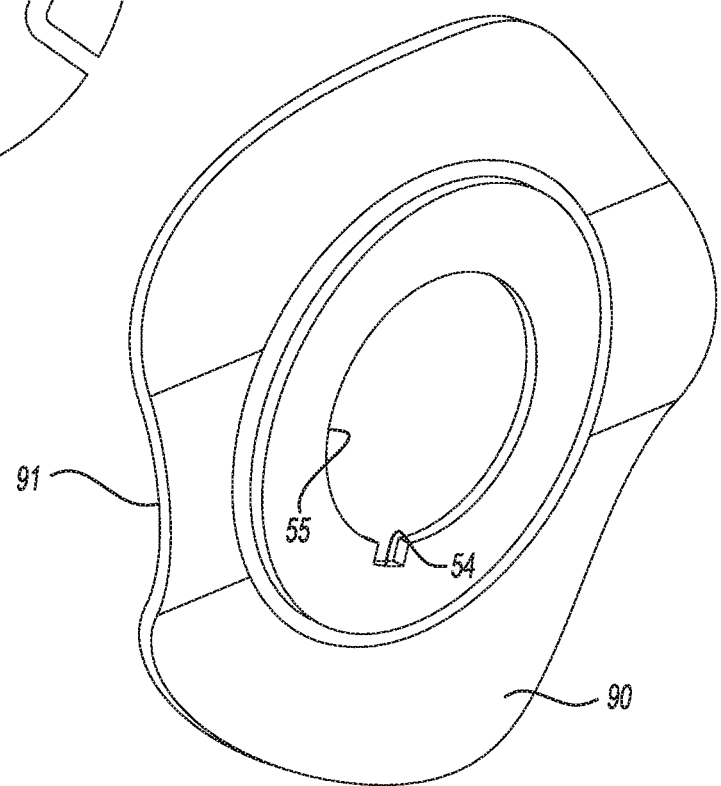
FIG. 4 is a perspective view of another example of an oil slinger according to the present disclosure.
Figure 5:
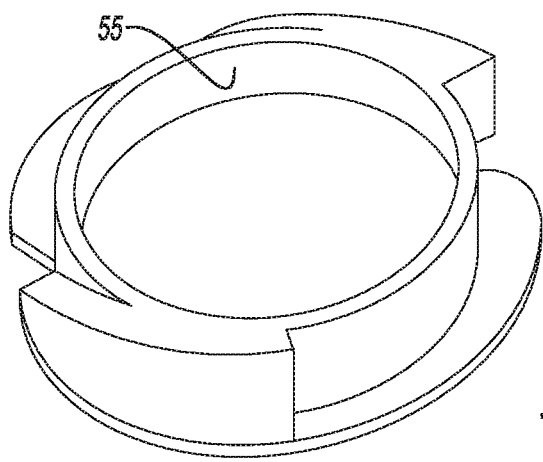
FIG. 5 is a perspective view of yet another example of an oil slinger according to the present disclosure.
Figure 6:
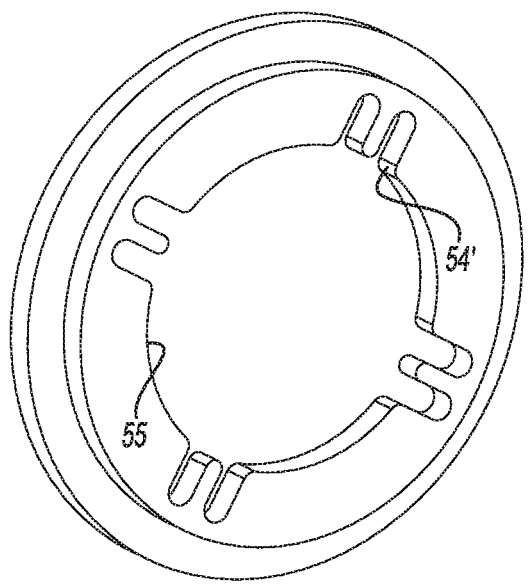
FIG. 6 is a perspective view of still another example of an oil slinger according to the present disclosure.
Figure 7:
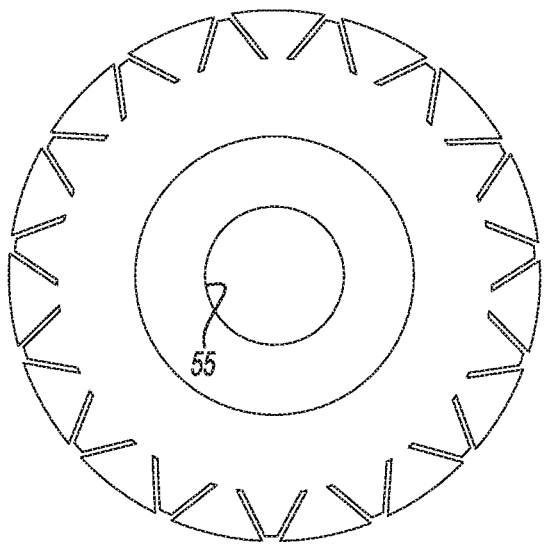
FIG. 7 is a top view of another example of an oil slinger according to the present disclosure.
Figure 8A:
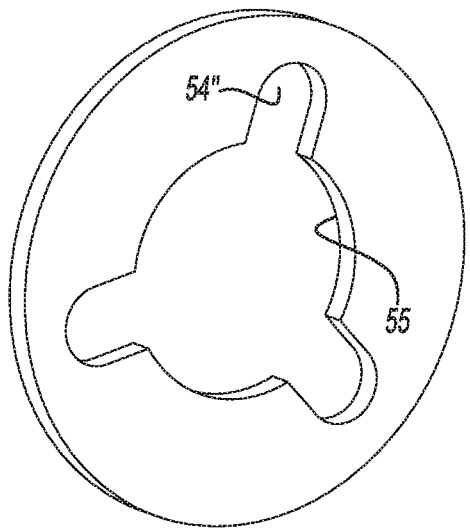
FIG. 8A is a perspective view of still another example of an oil slinger according to the present disclosure.
Figure 8B:
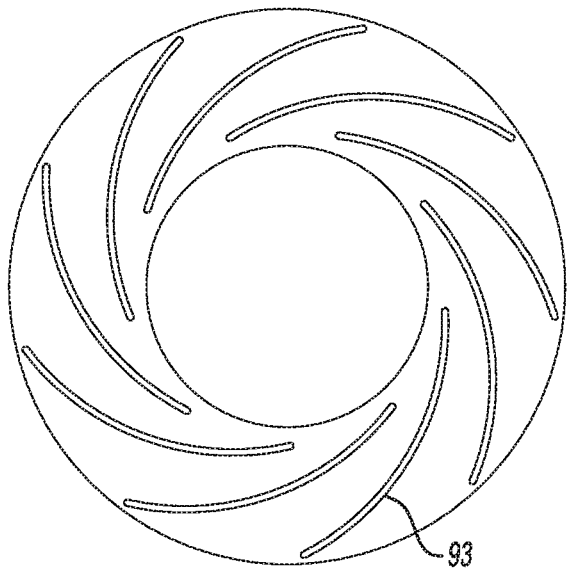
FIG. 8B is a top view of another example of an oil slinger according to the present disclosure.

FIGS. 3-8B depict oil slingers that may be included in examples of the present disclosure. Each slinger has a central aperture 55 to connect to a timing gear 58, 60, or a rotor shaft 29, 18. The slinger may be attached to rotate with the rotor shaft 29, 18 by a keyway 54 as depicted in FIG. 4. Other keyway-like structures 54', 54" are depicted in FIGS. 6 and 8A, respectively. The slingers in FIGS. 3, 5, and 7 do not have a keyway. Friction or welding may hold the slinger tightly to the timing gear 58, 60 or the rotor shaft 29, 18. FIG. 4 semi-schematically represents an oil slinger with a wavy surface. The number of waves on the surface may range from about 2 (as shown in FIG. 4) to about 100. Each wave has a crest 90 and a trough 91 as shown in FIG. 4. FIG. 8B depicts an example of an oil slinger with spiral grooves 93 in the surface.

Figure 9:
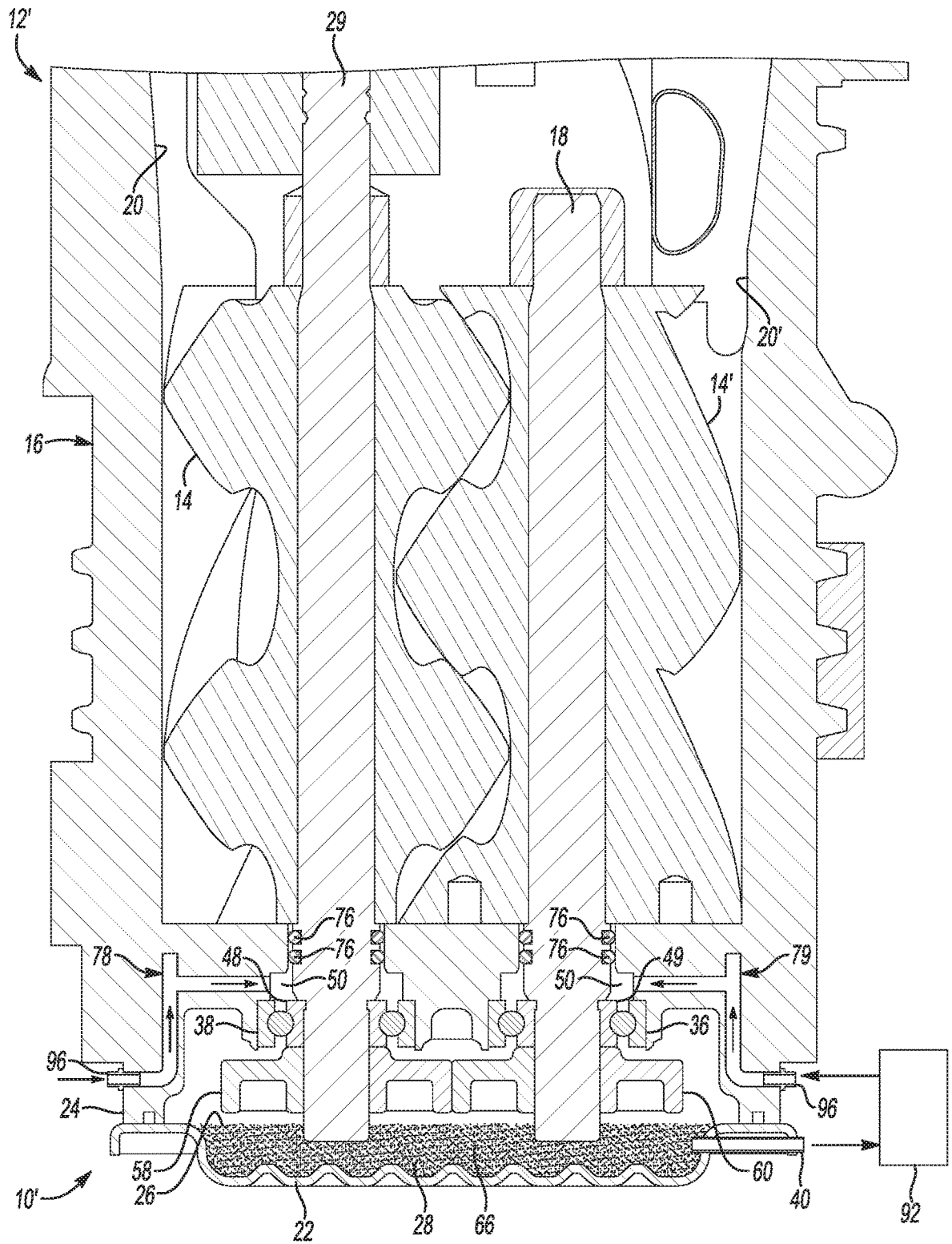
FIG. 9 is a cross-sectional view of a supercharger according to another example of the present disclosure.

FIG. 9 depicts another example of a lubrication system 10' according the present disclosure. The lubrication system 10' can be configured for use with a supercharger 12' in accordance with an example of the present disclosure. A driving shaft bearing 38 can be to support the driving rotor shaft 29 for rotation in the rotor housing 16. A driven shaft bearing 36 can be to support the driven rotor shaft 18 for rotation in the rotor housing 16. An oil sump housing 22 can be disposed to enclose a timing gear end 24 of the rotor housing 16. Shaft seals 76 are disposed between the rotor housing 16 and the driving and driven rotor shafts 29, 18.

The oil sump housing 22, the rotor housing 16 and the shaft seals 76 define a compartment 34 for oil 28 to lubricate the driving shaft bearing 38, the driven shaft bearing 36, and the timing gears 58, 60. The oil pools in the compartment 34, and a top surface 26 of the oil 28 is spaced below the timing gears 58, 60 when the driving rotor shaft 29 is in the vertical orientation. Since the driving rotor shaft 29 is parallel to the driven rotor shaft 18, when the driving rotor shaft 29 is vertical, the driven rotor shaft 18 is vertical. A return tube 40 can be in fluid communication with the compartment 34 to return the oil 28 to a source (not shown) of pressurized oil flow.

Figure 10:
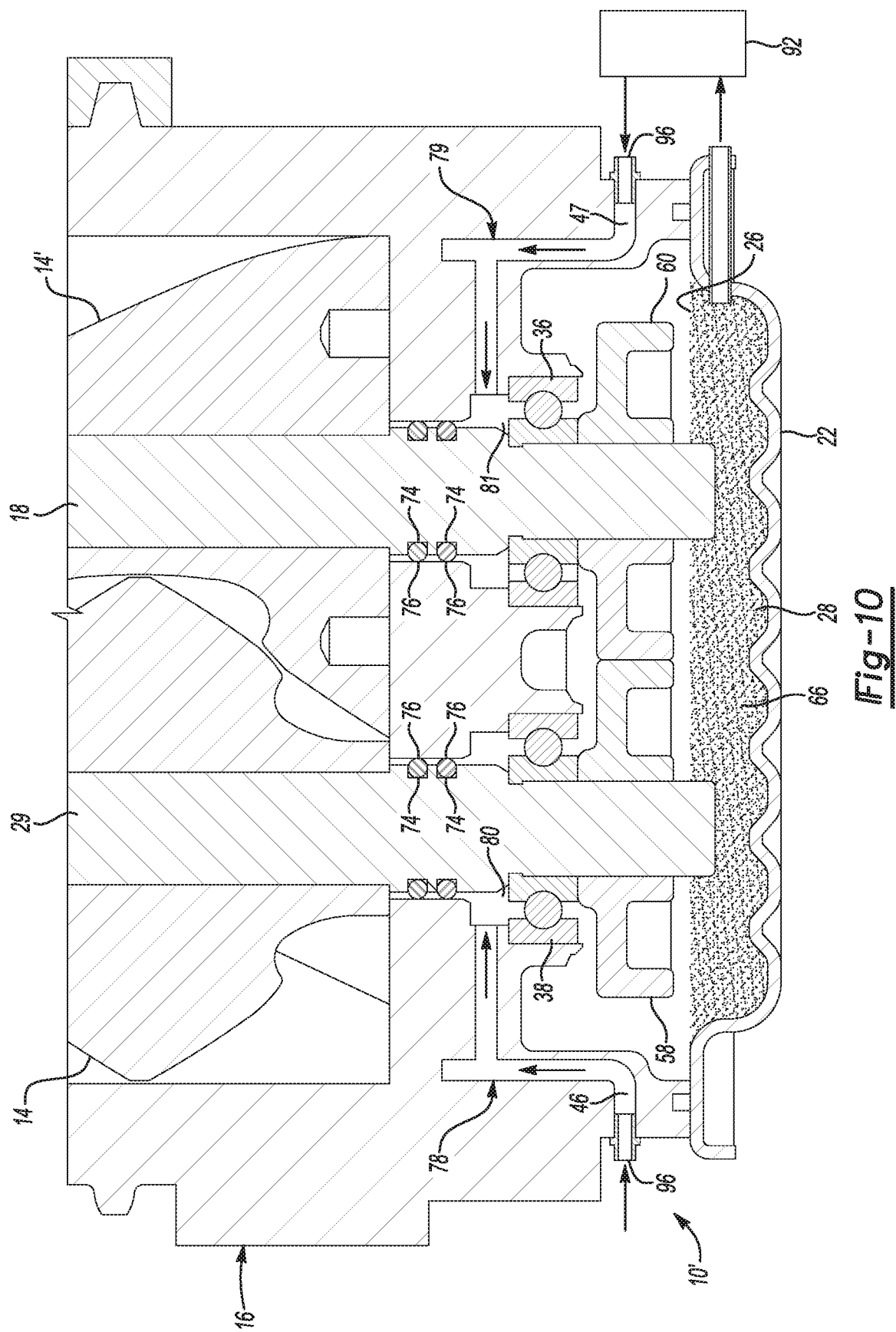
FIG. 10 is a cross-sectional view of a portion of the supercharger depicted in FIG. 9.

Referring now to FIG. 10, the supercharger 12' can include a first conduit 78 defined in the rotor housing 16 to convey the oil 28 to the driving shaft bearing 38. A first port 46 can be in fluid communication with the first conduit 78 to connect the first conduit 78 to a source (not shown) of pressurized oil flow. An oil flow restrictor 96 can be disposed between the first port 46 and the source of pressurized oil flow 92. The source of pressurized oil flow 92, for example, can be a pressurized engine oil circuit of the IC engine. In another example, the source of pressurized oil flow 92 can be an oil pump. It is to be understood that the source of pressurized oil flow 92 can have a return that is not pressurized. A second conduit 79 can be defined in the rotor housing 16 to convey the oil 28 to the driven shaft bearing 36. A second port 47 can be in fluid communication with the second conduit 79 to connect the second conduit 79 to the source of pressurized oil flow 92. An oil flow restrictor 96 can be disposed between the second port 47 and the source of pressurized oil flow 92.

Still referring to FIG. 10, in an example, the supercharger 12' can include a first chamber 80 above the driving shaft bearing 38 when the driving rotor shaft 29 is in the vertical orientation. A second chamber 81 can be above the driven shaft bearing 36 when the driven rotor shaft 18 is in the vertical orientation. The first conduit 78 can be to convey the oil 28 to the first chamber 80 to lubricate the driving shaft bearing 38. The oil 28 flows through the driving shaft bearing 38 to lubricate the driving timing gear 58. The second conduit 79 can be to convey the oil 28 to the second chamber 81 to lubricate the driven shaft bearing 36. The oil 28 can flow through the driven shaft bearing 36 to lubricate the driven timing gear 60.

Figure 11:
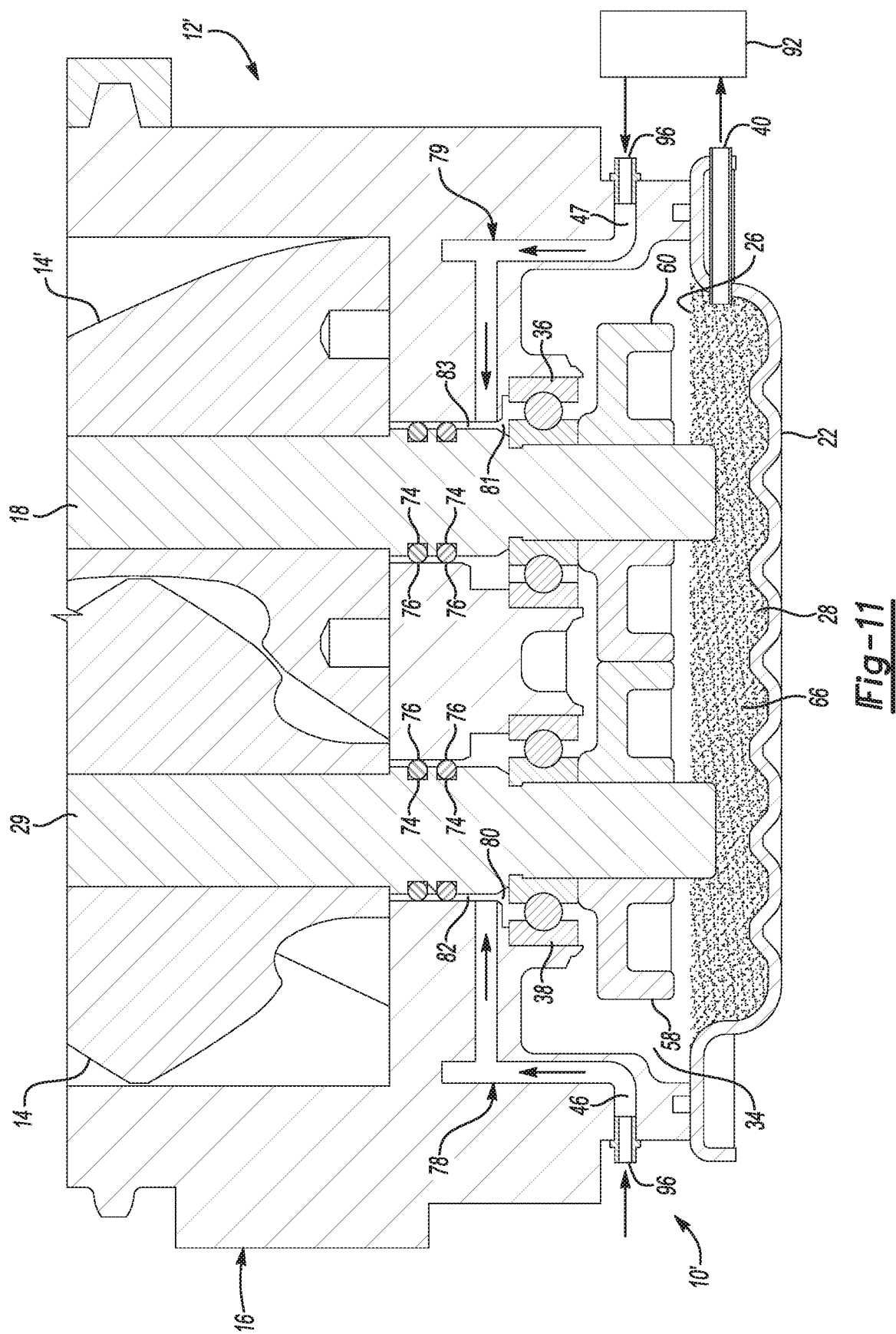
FIG. 11 is a cross-sectional view of the portion of the supercharger depicted in FIG. 9 with another oil distribution system.

Referring to FIG. 11, the supercharger 12' according to the present disclosure can include a first annular cavity 82 between the rotor housing 16 and the driving rotor shaft 29 above the driving shaft bearing 38 when the driving rotor shaft 29 is in the vertical orientation. A first chamber 80 can be defined between the first annular cavity 82 and the driving shaft bearing 38. A second annular cavity 83 can be defined between the rotor housing 16 and the driven rotor shaft 18 above the driven shaft bearing 36 when the driven rotor shaft 18 is in the vertical orientation. A second chamber 81 can be disposed between the second annular cavity 83 and the driven shaft bearing 36. The first conduit 78 can be to convey the oil 28 to the first annular cavity 82 to lubricate the driving shaft seals 76. The driving shaft seal 76 can be a lip seal as depicted in FIG. 2B. In other examples, the driving shaft seal 76 can be an O-ring seal or a split-ring seal. The oil 28 can flow from the first annular cavity 82 through the first chamber 80 to lubricate the driving shaft bearing. The oil 28 can flow through the driving shaft bearing 38 to lubricate the driving timing gear 58. The second conduit 79 can be to convey the oil 28 to the second annular cavity 83 to lubricate the driven shaft seals 76. The oil 28 can flow from the second annular cavity 83 through the second chamber 81 to lubricate the driven shaft bearing 36. The oil 28 can flow through the driven shaft bearing 36 to lubricate the driven timing gear 60.

Figure 12:
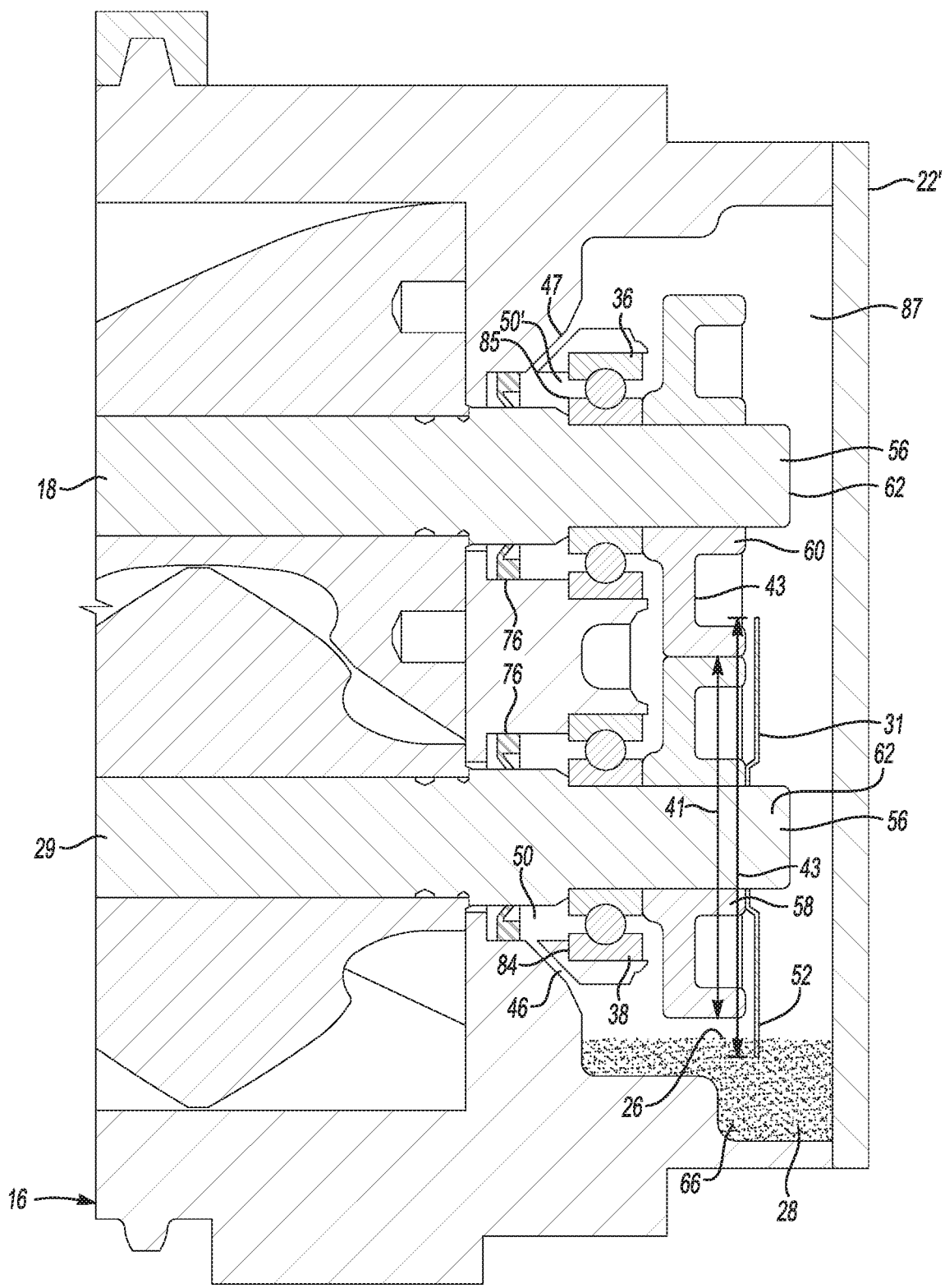
FIG. 12 is a cross-sectional view of a portion of a supercharger according to an example of the present disclosure.

FIG. 12 depicts another example of a lubrication system 10" according the present disclosure. The lubrication system 10" can be configured for use with a supercharger 12" in accordance with an example of the present disclosure. A driving shaft bearing 38 can be to support the driving rotor shaft 29 for rotation in the rotor housing 16. A driven shaft bearing 36 can be to support the driven rotor shaft 18 for rotation in the rotor housing 16. An oil sump housing 22' can be disposed to enclose a timing gear end 24 of the rotor housing 16. It is to be understood that the present disclosure includes superchargers having additional gears, bearings, seals, and lubricated parts enclosed by the oil sump housing 22'. Accordingly, the oil sump housing 22' depicted in FIG. 12 can be a simplified representation of a portion of the supercharger 12" that encloses the timing gear end 24 of the rotor housing 16. Shaft seals 76 are disposed between the rotor housing 16 and the driving and driven rotor shafts 29, 18.

The oil sump housing 22', the rotor housing 16 and the shaft seals 76 define a closed container 87 for oil to lubricate the driving shaft bearing 38, the driven shaft bearing 36, the timing gears 58, 60, and the shaft seals 76. The oil 28 pools in the closed container 87, and a top surface 26 of the oil 28 is spaced below the timing gear 58, 60 when the driving rotor shafts 29 is in a horizontal orientation. Since the driving rotor shaft 29 is parallel to the driven rotor shaft 18, when the driving rotor shaft 29 is horizontal, the driven rotor shaft 18 is horizontal. As shown in FIG. 12, the top surface 26 of the oil 28 is spaced below the driving timing gear 58, which can be even farther below the driven timing gear 60. It is to be understood that the driving timing gear 58 and the driven timing gear 60 can be rearranged so that the driven timing gear 60 is below the driving timing gear 58. As used herein, a horizontal orientation can be defined to mean that the rotor shafts 29, 18 are horizontal, and that the top surface 26 of the oil 28 in the closed container 87 is below the timing gears 58, 60. It is to be understood that the supercharger 12" can be operable at other orientations. In an example, the supercharger 12" can be operable with the rotor shafts 29, 18 at any angle up to +/−45 degrees from horizontal. In another example, the supercharger 12" can be operated at any angle, for example, in a supercharged aircraft that can perform aerobatic maneuvers.

The supercharger 12" according to the present disclosure can have a rotary oil slinger 31 connected to the driving rotor shaft 29 or the driving timing gear 58 for rotation therewith. An outer diameter 43 of the rotary oil slinger 31 can be larger than an addendum circle diameter 41 of the driving timing gear 58. The outer diameter 43 of the rotary oil slinger 31 can be large enough to reach below the top surface 26 of the oil 28. A first port 46 can be defined by the rotor housing 16 to convey the oil 28 to a blind side 84 of the driving shaft bearing 38. Gravity and momentum urge the oil 28 to flow through the driving shaft bearing 38 for lubrication thereof. The rotary oil slinger 31 urges the oil 28 to flow through the first port 46 to a first chamber 80 adjacent the driving shaft bearing 38.

A second port 47 can be defined by the rotor housing 16 to convey the oil 28 to a blind side 85 of the driven shaft bearing 36. Gravity and momentum urge the oil 28 to flow through the driven shaft bearing 36 for lubrication thereof. The rotary oil slinger 31 urges the oil 28 to flow through the second port 47 to a second chamber 81 adjacent the driven shaft bearing 36.

Figure 13:
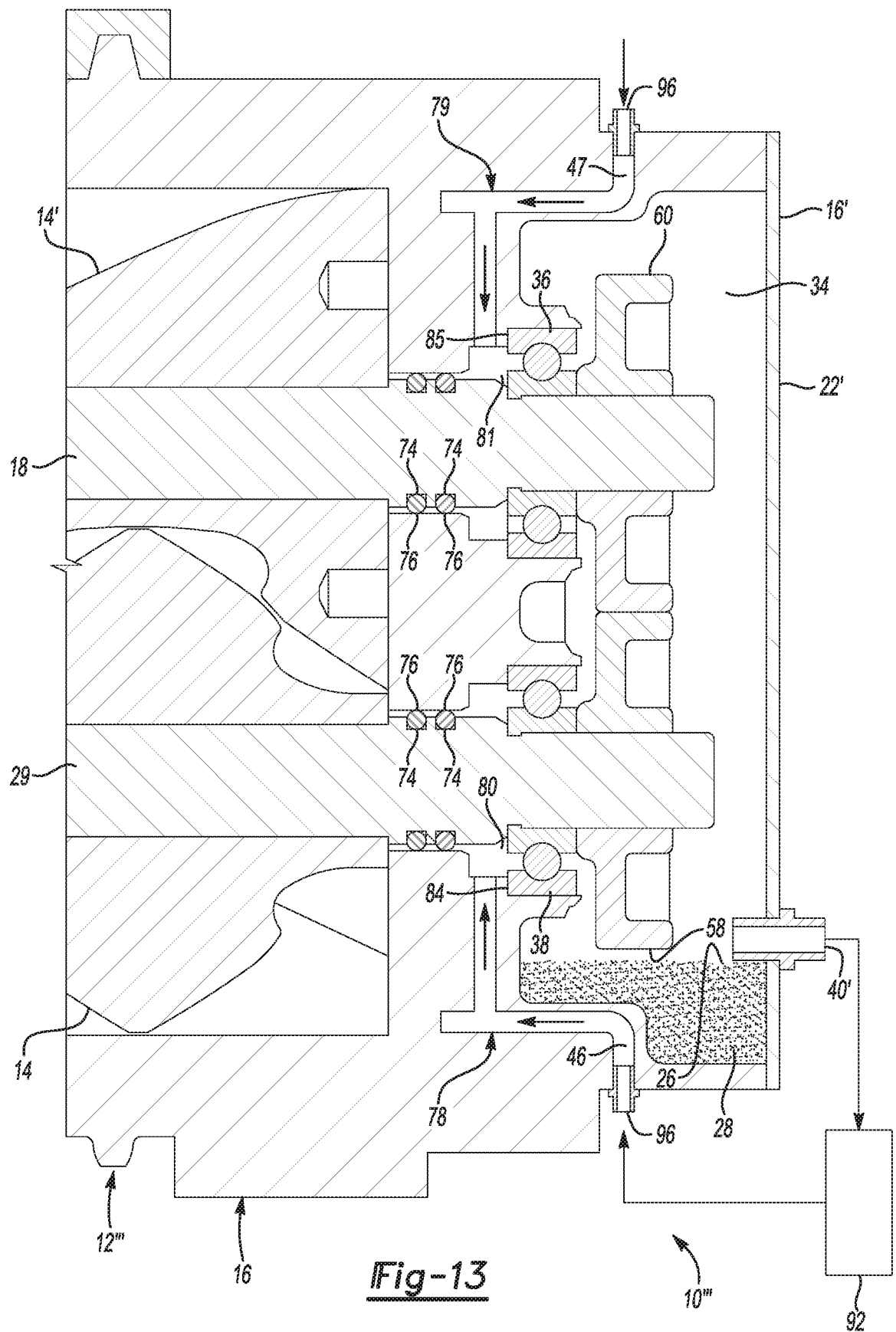
FIG. 13 is a cross-sectional view of a portion of a supercharger according to the present disclosure.

FIG. 13 depicts another example of a lubrication system 10''' according the present disclosure. The lubrication system 10''' can be configured for use with a supercharger 12''' in accordance with an example of the present disclosure. A driving shaft bearing 38 is to support the driving rotor shaft 29 for rotation in the rotor housing 16'. A driven shaft bearing 36 can be to support the driven rotor shaft 18 for rotation in the rotor housing 16'. An oil sump housing 22' can be disposed to enclose a timing gear end 24 of the rotor housing 16'. It is to be understood that the present disclosure includes superchargers having additional gears, bearings, seals, and lubricated parts enclosed by the oil sump housing 22'. Accordingly, the oil sump housing 22' depicted in FIG. 13 can be a simplified representation of a portion of the supercharger 12''' that encloses the timing gear end 24 of the rotor housing 16'. Shaft seals 76 are disposed between the rotor housing 16' and the driving and driven rotor shafts 29, 18.

The oil sump housing 22', the rotor housing 16' and the shaft seals 76 define a closed container 87 for oil 28 to lubricate the driving shaft bearing 38, the driven shaft bearing 36, and the timing gears 58, 60, and the shaft seals 76. The oil pools in the closed container 87, and a top surface 26 of the oil 28 is spaced below the timing gears 58, 60 when the driving rotor shaft 29 is in the horizontal orientation. Since the driving rotor shaft 29 is parallel to the driven rotor shaft 18, when the driving rotor shaft 29 is horizontal, the driven rotor shaft 18 is horizontal. As shown in FIG. 13, the top surface 26 of the oil 28 can be spaced below the driving timing gear 58, which can be even farther below the driven timing gear 60. It is to be understood that the driving timing gear 58 and the driven timing gear 60 can be rearranged so that the driven timing gear 60 is below the driving timing gear 58. A return tube 40' can be in fluid communication with the compartment 34 to return the oil 28 to a source (not shown) of pressurized oil flow. The location of the return tube 40' defines the location of the top surface 26 of the oil 28 in the sump housing 22.

Still referring to FIG. 13, the supercharger 12''' can include a first conduit 78 defined in the rotor housing 16' to convey the oil 28 to the driving shaft bearing 38. A first port 46 can be in fluid communication with the first conduit 78 to connect the first conduit 78 to a source (not shown) of pressurized oil flow. An oil flow restrictor 96 can be disposed between the first port 46 and the source of pressurized oil flow 92. The source of pressurized oil flow 92, for example, can be a pressurized engine oil circuit of the IC engine. In another example, the source of pressurized oil flow 92 can be an oil pump. A second conduit 79 can be defined in the rotor housing 16' to convey the oil 28 to the driven shaft bearing 36. A second port 47 can be in fluid communication with the second conduit 79 to connect the second conduit 79 to the source of pressurized oil flow 92. An oil flow restrictor 96 can be disposed between the second port 47 and the source of pressurized oil flow 92.

Still referring to FIG. 13, in an example, the supercharger 12''' can include a first chamber 80 adjacent the driving shaft bearing 38. A second chamber 81 can be adjacent the driven shaft bearing 36. The first conduit 78 can be to convey the oil 28 to the first chamber 80 to lubricate the driving shaft bearing 38. The oil 28 flows through the driving shaft bearing 38 to lubricate the driving timing gear 58. The second conduit 79 can be to convey the oil 28 to the second chamber 81 to lubricate the driven shaft bearing 36. The oil 28 can flow through the driven shaft bearing 36 to lubricate the driven timing gear 60.

Figure 14:
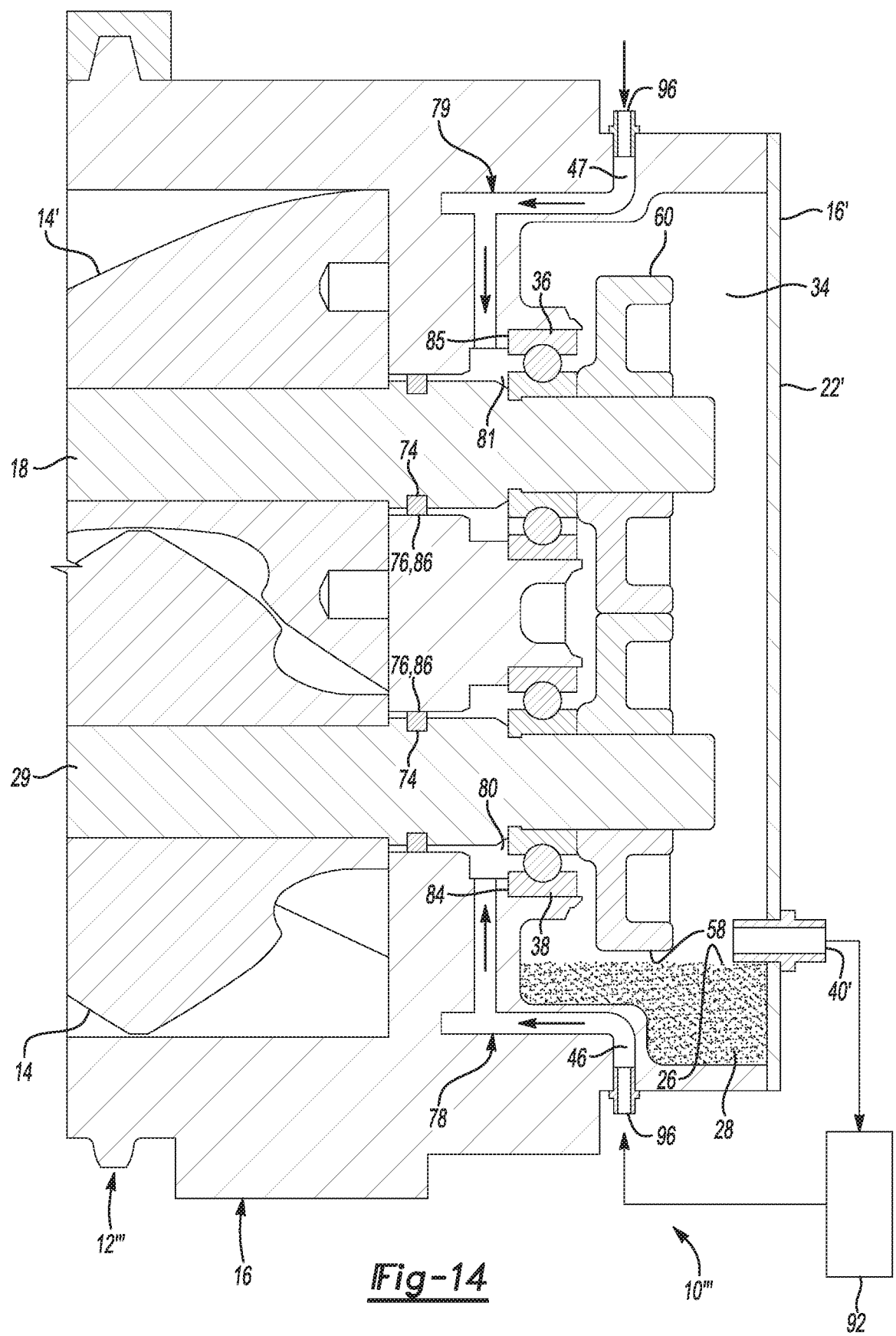
FIG. 14 is a cross-sectional view of a portion of the supercharger depicted in FIG. 13 with split-ring shaft seals.

FIG. 14 depicts another example of the lubrication system 10''' and supercharger 12''' depicted in FIG. 13. FIG. 14, however, has a single shaft seal 76 per shaft 18, 29. In the example depicted in FIG. 14, each shaft seal 76 can be a split-ring seal 86 similar to a piston ring seal. The supercharger 12''' can provide boost pressures up to about 4 Bar (400 kilopascals). A boost pressure of about 1.7 Bar (170 kilopascals) can be produced in examples of superchargers of the present disclosure. A small amount of air, driven by the pressure in the cylindrical chambers 20, 20', can flow past the shaft seals 76 into the compartment 34. For example, about 10 liters per minute (lpm) of air can flow past the shaft seals 76 when the pressure difference is about 2 bar. In superchargers 12''' with the lubrication system 10''' depicted in FIGS. 13 and 14, the pressure in the compartment 34 does not build up from the air that flows past the shaft seals 76. The air in the compartment 34 can be vented through the return tube 40' to the source of pressurized oil flow 92. In an example, the return tube 40' vents the air and oil to the crankcase of the IC engine (not shown) to be handled by a crankcase ventilation system (not shown). The split-ring seals 86 produce less drag than O-ring seals or lip-seals produce on the rotating shafts 18, 29. The split-ring seals 86 also allow more air to flow past themselves than O-ring seals or lip seals. Therefore, examples of the present disclosure with the lubrication system 10''' depicted in FIG. 14 can have less drag from the shaft seals 76 because lower drag seals, for example split-ring seals 86, can be used when the gear box is vented.

It is to be understood that use of the words "a" and "an" and other singular referents may include plural as well, both in the specification and claims, unless the context clearly indicates otherwise.

Further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Still further, it is to be understood that the ranges provided herein include the stated range and any value or sub-range within the stated range. For example, an angle ranging from about −45 degrees to about +45 degrees from vertical should be interpreted to include not only the explicitly recited limits of −45 degrees to +45 degrees from vertical, but also to include individual amounts, such as −40 degrees from vertical, +32 degrees from vertical, etc., and sub-ranges, such as from about −20 degrees to about +25 degrees from vertical, etc. Furthermore, when "about" is utilized to describe a value, this is meant to encompass minor variations (±10% from the stated value (e.g., about 30 degrees is 27 degrees to 33 degrees)).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples can be modified. Therefore, the foregoing description is to be considered non-limiting.

What is claimed is:

1. A supercharger, comprising:
a rotor housing defining a pair of cylindrical chambers;
a driving shaft bearing to support a driving rotor shaft for rotation in the rotor housing;
a driven shaft bearing to support a driven rotor shaft for rotation in the rotor housing;
an oil sump housing to enclose a timing gear end of the rotor housing;
a driving shaft seal disposed between the rotor housing and the driving rotor shaft;
a driven shaft seal disposed between the rotor housing and the driven rotor shaft;
a first port in fluid communication with a first source of pressurized oil flow and a first chamber, the first chamber supplying oil to the driving shaft bearing;
a first flow restrictor disposed between the first port and the first source of the pressurized oil flow;
a second port in fluid communication with a second source of pressurized oil flow and a second chamber, the second chamber supplying oil to the driven shaft bearing; and
a second flow restrictor disposed between the second port and the second source of the pressurized oil flow;
wherein the oil sump housing, the rotor housing, the driving shaft seal, and the driven shaft seal define a closed container for oil to lubricate the driving shaft bearing, the driven shaft bearing, a driving timing gear, and a driven timing gear; and
wherein the oil pools in the closed container and a top surface of the oil is spaced below the driving timing gear and the driven timing gear when the driving rotor shaft is in a vertical orientation, and wherein the oil sump housing is beneath the driving rotor shaft.

2. The supercharger as defined in claim 1, further comprising:
a first rotor in intermeshing engagement with a second rotor in the pair of cylindrical chambers wherein:
the driving rotor shaft is rotatable with the first rotor;
the driving timing gear is disposed on the driving rotor shaft for rotation therewith;
the driven timing gear is meshingly engaged with the driving timing gear; and
the driven rotor shaft is rotatable with the second rotor and coupled to the driven timing gear for rotation therewith.

3. The supercharger as defined in claim 1, wherein the first flow restrictor is partially retained within the first port.

4. The supercharger as defined in claim 1, wherein the second flow restrictor is partially retained within the second port.

5. A supercharger, comprising:
a rotor housing defining a pair of cylindrical chambers;
a first rotor in intermeshing engagement with a second rotor in the pair of cylindrical chambers;
a driving rotor shaft rotatable with the first rotor;
a driving timing gear disposed on the driving rotor shaft for rotation therewith;
a driven timing gear meshingly engaged with the driving timing gear;
a driven rotor shaft rotatable with the second rotor and coupled to the driven timing gear for rotation therewith;
a driving shaft bearing to support the driving rotor shaft for rotation in the rotor housing;
a driven shaft bearing to support the driven rotor shaft for rotation in the rotor housing;

an oil sump housing disposed to enclose a timing gear end of the rotor housing;

a driving shaft seal disposed between the rotor housing and the driving rotor shaft;

a driven shaft seal disposed between the rotor housing and the driven rotor shaft;

a first conduit defined by the rotor housing to convey oil to the driving shaft bearing;

a first port in fluid communication with the first conduit to connect the first conduit to a source of pressurized oil flow;

a first flow restrictor disposed between the first port and the first source of the pressurized oil flow;

a second conduit defined by the rotor housing to convey oil to the driven shaft bearing;

a second port in fluid communication with the second conduit to connect the second conduit to the source of pressurized oil flow; and a second flow restrictor disposed between the second port and the second source of the pressurized oil flow;

wherein the oil sump housing, the rotor housing, the driving shaft seal, and the driven shaft seal define a compartment for oil to lubricate the driving shaft bearing, the driven shaft bearing, the driving timing gear, and the driven timing gear; and wherein the oil pools in the compartment, and a top surface of the oil is spaced below the driving timing gear and the driven timing gear when the driving rotor shaft is in a vertical orientation, and wherein the oil sump housing is beneath the first rotor.

6. The supercharger as defined in claim 5, further comprising:

a first chamber above the driving shaft bearing when the driving rotor shaft is in the vertical orientation; and a second chamber above the driven shaft bearing when the driven rotor shaft is in the vertical orientation wherein:

the first conduit is to convey the oil to the first chamber to lubricate the driving shaft bearing;

the oil flows through the driving shaft bearing to lubricate the driving timing gear;

the second conduit is to convey the oil to the second chamber to lubricate the driven shaft bearing; and the oil flows through the driven shaft bearing to lubricate the driven timing gear.

7. The supercharger as defined in claim 5, further comprising:

a first annular cavity between the rotor housing and the driving rotor shaft above the driving shaft bearing when the driving rotor shaft is in the vertical orientation;

a first chamber between the first annular cavity and the driving shaft bearing;

a second annular cavity between the rotor housing and the driven rotor shaft above the driven shaft bearing when the driven rotor shaft is in the vertical orientation; and a second chamber between the second annular cavity and the driven shaft bearing, wherein:

the first conduit is to convey the oil to the first annular cavity to lubricate the driving shaft seal;

the oil flows from the first annular cavity through the first chamber to lubricate the driving shaft bearing;

the oil flows through the driving shaft bearing to lubricate the driving timing gear;

the second conduit is to convey the oil to the second annular cavity to lubricate the driven shaft seal;

the oil flows from the second annular cavity through the second chamber to lubricate the driven shaft bearing; and the oil flows through the driven shaft bearing to lubricate the driven timing gear.

8. The supercharger as defined in claim 5, further comprising a return tube in fluid communication with the compartment to return oil to the source of pressurized oil flow.

9. The supercharger as defined in claim 5, wherein the rotor housing defines the entire first conduit.

10. The supercharger as defined in claim 5, wherein the rotor housing defines the entire second conduit.

11. The supercharger as defined in claim 5, wherein the first flow restrictor is partially retained within the first port.

12. The supercharger as defined in claim 5, wherein the second flow restrictor is partially retained within the second port.

\* \* \* \* \*